US007466796B2

(12) United States Patent
Bloom

(10) Patent No.: US 7,466,796 B2
(45) Date of Patent: Dec. 16, 2008

(54) CONDENSER ZONE PLATE ILLUMINATION FOR POINT X-RAY SOURCES

(75) Inventor: Scott H. Bloom, Encinitas, CA (US)

(73) Assignee: Gatan, Inc., Warrendale, PA (US)

( * ) Notice: Subject to any disclaimer, the term of this patent is extended or adjusted under 35 U.S.C. 154(b) by 123 days.

(21) Appl. No.: 11/161,509

(22) Filed: Aug. 5, 2005

(65) Prior Publication Data

US 2006/0049355 A1 Mar. 9, 2006

Related U.S. Application Data

(60) Provisional application No. 60/599,203, filed on Aug. 5, 2004.

(51) Int. Cl.
*G02B 21/06* (2006.01)

(52) U.S. Cl. .......................................... 378/43; 378/70

(58) Field of Classification Search .................. 378/43, 378/51, 79, 84, 85, 145, 70
See application file for complete search history.

(56) References Cited

U.S. PATENT DOCUMENTS

| | | | |
|---|---|---|---|
| 3,723,246 | A | 3/1973 | Lubin |
| 4,205,278 | A | 5/1980 | George et al. |
| 4,317,036 | A | 2/1982 | Wang |
| 4,376,752 | A | 3/1983 | Nuckolls et al. |
| 4,432,933 | A | 2/1984 | Teitel et al. |
| 4,608,222 | A | 8/1986 | Brueckner |
| 4,687,618 | A | 8/1987 | Nuckolls et al. |
| 4,723,262 | A | 2/1988 | Noda et al. |
| 4,870,674 | A | 9/1989 | Schmahl et al. |
| 4,979,203 | A | 12/1990 | Suckewer et al. |
| 5,021,628 | A | 6/1991 | Lemelson |
| 5,107,526 | A | 4/1992 | Hoover |
| 5,131,023 | A | 7/1992 | Yasugaki et al. |
| 5,131,957 | A | 7/1992 | Epstein et al. |
| 5,132,994 | A | 7/1992 | Kato |
| 5,177,774 | A | 1/1993 | Suckewer et al. |
| 5,204,887 | A | 4/1993 | Hayashida et al. |
| 5,216,699 | A | 6/1993 | Iketaki |
| 5,222,113 | A | 6/1993 | Thieme et al. |
| 5,311,565 | A | 5/1994 | Horikawa |
| 5,351,279 | A | 9/1994 | She et al. |
| 5,434,901 | A | 7/1995 | Nagai et al. |
| 5,450,463 | A | 9/1995 | Iketaki |
| 5,487,094 | A | 1/1996 | Sudo |

(Continued)

OTHER PUBLICATIONS

Kaulich, Burkhard, et al.; Differential Interference Contrast X-Ray Microscopy With Twin Zone Plates; 2002 Optical Society of America; vol. 19, No. 4/Apr. 2002/J. Opt. Soc. Am. A, pp. 797-806.

(Continued)

*Primary Examiner*—Hoon Song
(74) *Attorney, Agent, or Firm*—Caesar, Rivise, Bernstein, Cohen & Pokotilow, Ltd.

(57) ABSTRACT

An improved short-wavelength microscope is described in which a specimen sample is placed between a condenser zone plate lens and an objective zone plate lens so that the specimen is aligned with a diffraction order of the condenser zone plate lens that is greater than one and proximal to the condenser zone plate.

18 Claims, 7 Drawing Sheets

U.S. PATENT DOCUMENTS 5,550,887 A 8/1996 Schmal et al.
5,590,168 A 12/1996 Iketaki
5,680,429 A 10/1997 Hirose et al.
5,790,627 A 8/1998 Iketaki
5,832,052 A 11/1998 Hirose et al.
5,864,599 A 1/1999 Cowan, deceased et al.
5,991,360 A 11/1999 Matsui et al.
6,157,701 A 12/2000 Hirose et al.
6,167,112 A * 12/2000 Schneider .................... 378/43
6,304,630 B1 10/2001 Bisschops et al.
6,389,101 B1 * 5/2002 Levine et al. ................. 378/85
6,522,717 B1 2/2003 Murakami et al.
7,119,953 B2 * 10/2006 Yun et al. ................... 359/385
2003/0223536 A1 * 12/2003 Yun et al. ..................... 378/45

OTHER PUBLICATIONS

Springate, E., et al.; Explosion of Atomic Clusters Irradiated by High-Intensity Laser Pulses; Scaling of Ion Energies With Cluster and Laser Parameters; 2000 The American Physical Society; Physical Review A, vol. 61, 063201.

Haefke, Henry, Nanoplasma Production, Characterization and Application of a Mesoscopic Plasma; http://www.snf.ch/nfp/nfp36/progress/haefke.html, Jun. 3, 2004.

* cited by examiner

*FIG. 1*
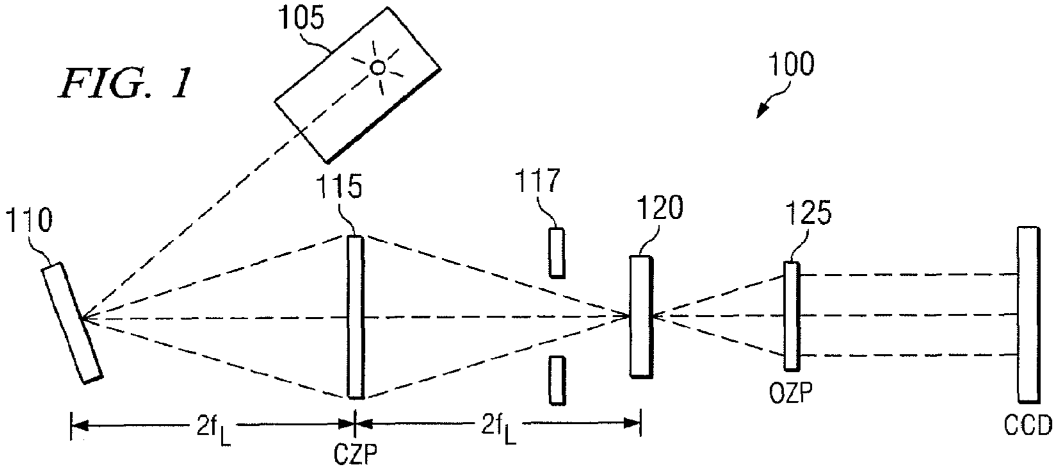
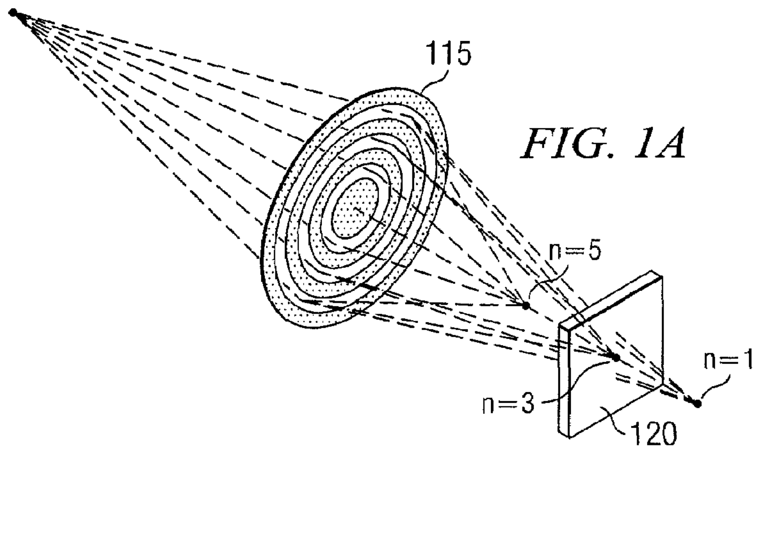
*FIG. 1A*

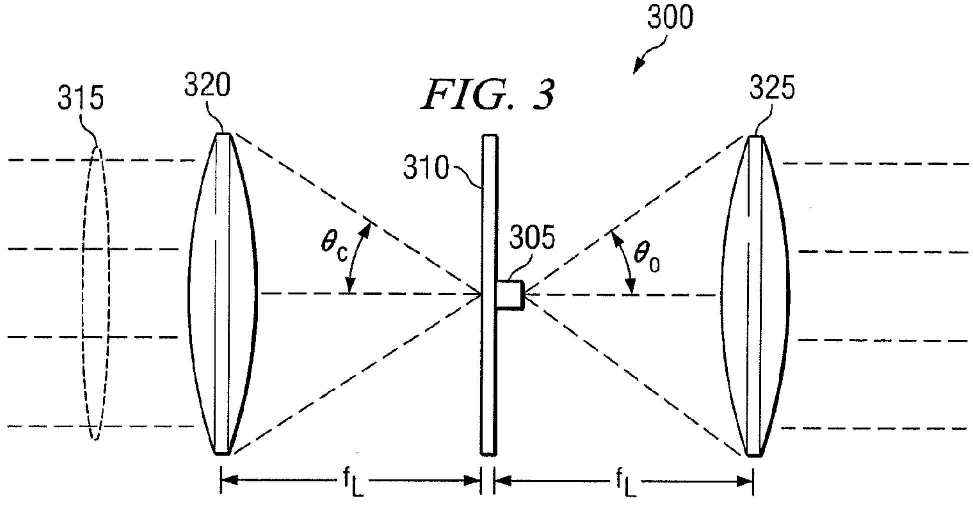
*FIG. 3*
*FIG. 4*
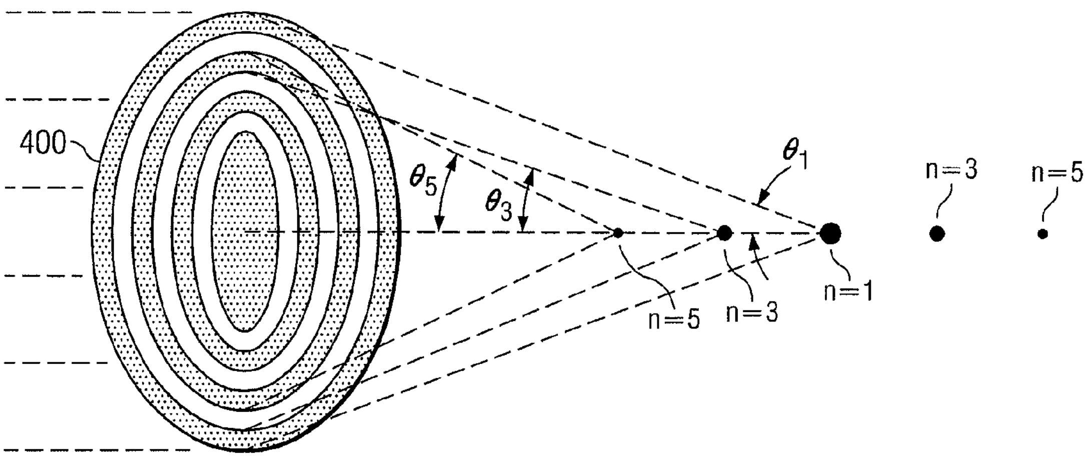

CONDENSER ZONE PLATE ILLUMINATION FOR POINT X-RAY SOURCES

CROSS-REFERENCE TO RELATED APPLICATIONS

This application claims priority to U.S. Provisional Patent Application No. 60/599,203 filed on Aug. 5, 2004, entitled "Condenser Zone Plate Illumination for Point X-ray Sources," the entire contents of which is hereby incorporated by reference.

TECHNICAL FIELD

This disclosure relates to microscopy based upon X-rays and other short-wavelength radiation.

BACKGROUND

All microscopes operate under a common set of principles, which can be described with reference to FIG. 3 of this application. To view the microscopic details of a specimen 305, it is placed on a specimen stage 310 in a microscope 300. An illumination light source 315 passes through a light condenser 320 before illuminating the sample 305. After passing through the sample, the light scattered by the sample is captured by the objective lens 325 and is passed to a scope or other imager for viewing. In addition to the magnification power of the objective 325, other factors can affect the quality of the magnified image. For example, the numerical aperture (NA) of the condenser 320 and objective 325 can greatly affect the resolution of the microscopic image of the specimen 305. The numerical aperture of a lens is defined by the equation NA=n*sin(.theta.) where n is the index of refraction of the lens and .theta. is the angular aperture of the lens, which is the angle between the centerline of the lens and a line from the focus point to the edge of a lens. To obtain the best resolution of an imaged specimen, the numerical aperture should be as high as possible and, importantly, the numerical aperture of the condenser (NA.sub.C) should be greater than or equal to the numerical aperture of the objective (NA-.sub.O). A high numerical aperture means that light is directed to and collected from a wide variety of angles as it passes through the specimen. Since light is focused and collected from a variety of angles, the resolution of the microscopic image is greatly improved. Other factors that affect the quality of the imaged sample include the intensity of the illumination, the power of magnification, and the focal length of the lenses.

In recent years, interest has grown in using X-rays and other short-wavelength radiation as an illumination source for microscopy. X-ray microscopes use the same principles of microscopy that are described above, but instead use X-rays as an illumination source. X-rays have unique advantages over visible light and other wavelengths. X-ray wavelengths are much shorter than visible light wavelengths, thereby increasing the resolution of the microscope at high magnification. In addition, X-rays readily penetrate most materials or specimens, thereby improving the resolution of interior features of imaged specimens. Instead of using lenses that refract and focus light, X-ray microscopes use zone plate lenses to diffract light for focusing purposes. A representative example of a zone plate lens 400 suitable for this purpose is depicted in FIG. 4. The zone plate lens 400 depicted in FIG. 4 is a pattern of alternating opaque and transparent concentric regions. Each of the concentric regions has a smaller radial width as one moves towards the edge of the zone plate lens 400. This is because each region (opaque or transparent) in the zone plate lens 400 occupies the same area. The zone plate uses diffraction rather than refraction to focus the light that passes through it. In other words, the pattern of concentric rings creates a diffraction pattern that has its largest maximum at the first diffractive order (n=1). The zone plate also creates higher-order diffractive orders on each side of the first order (n=3, n=5, etc.). Each of these higher-order diffractive orders is less intense that the first order diffractive order by a factor of 1/n.sup.2. It is worth noting that when the light provided to a zone plate is perfectly collimated, the first order of diffraction will be found at the focal length of the zone plate, as shown in FIG. 4. Where the incoming light is not collimated, however, the first diffractive order will not be precisely aligned with the focal length of the zone plate.

One example of an X-ray microscope system 500 using these concepts is depicted in FIG. 5 and is described below. In FIG. 5, an X-ray source 505, such as a synchrotron, generates X-rays or other short-wavelength radiation. These X-rays pass through a long optical path so that the rays are nearly collimated by the time that they reach the condenser 515 of the microscope system 500. For example, where a radiation source 505 is placed 10-20 meters from the rest of the microscope system 500, the X-rays will only have a divergence of about 0.5 mrad. Reflecting devices, such as a plane mirror 510, can be used to extend the optical length of the X-ray source 505. The X-ray radiation is collected by a condenser zone plate 515, which creates a diffraction pattern with a maximum at its first order of diffraction. Since the incoming X-rays are nearly collimated at the condenser zone plate 515, the first order of diffraction will be nearly identical to the focal length of the condenser zone plate. For example, assuming a 20 meter distance from the X-ray source 505 and a 200 mm focal length for the condenser zone plate 515, the first diffraction order should be located at about 202 mm, which is close to the focal length of 200 mm. After passing through the condenser zone plate 515, the X-rays pass through a sample mounted on a sample stage 520 and are collected by an objective zone plate 525. The objective zone plate 525 also uses diffractive principles to focus the X-rays onto an imaging device, such as a CCD imager 530. Generally, the numerical aperture of the condenser zone plate 515 (NA.sub.C) should be greater than or equal to the numerical aperture of the objective zone plate 525 (NA.sub.O) in order to maximize the resolution of the microscope.

The X-ray microscope system 500 depicted in FIG. 5 includes several limitations. First, an X-ray source capable of generating sufficient power to be of interest for microscopy will generally require a synchrotron, which is a large, expensive, and cumbersome device to operate. Second, a long optical path is needed to ensure that that X-rays are nearly collimated when they reach the condenser zone plate. A long optical path adds significant size and heft to the device and also makes the device more susceptible to vibration and misalignment. Accordingly, a need exists for a more efficient and less bulky X-ray microscope system.

SUMMARY

An improved short-wavelength microscope is disclosed herein. According to one embodiment of the invention, the microscope comprises a condenser zone plate that operable to receive short-wavelength radiation from a point source and focus the short-wavelength radiation onto a specimen sample, wherein the specimen sample is mounted on a sample stage that is aligned with a diffraction order of the condenser zone plate that is greater than one, and wherein an objective zone plate receives the short wavelength radiation that has passed through the imaging sample and focuses the short wavelength radiation onto an imaging device. According to one embodiment of the invention, the numerical aperture of the condenser zone plate is greater than or equal to the numerical aperture of the objective zone plate. According to another embodiment of the invention, the microscope device also includes a pinhole device that is placed between the condenser zone plate lens and the sample stage so that the aperture of the pinhole device allows radiation of the desired wavelength to pass through to the sample, but blocks undesirable wavelengths from the sample. According to yet another embodiment of the invention, the point source of short-wavelength radiation is provided by a metallic target that is illuminated by at least one high-power laser with a spot size less than about 50 nm.

BRIEF DESCRIPTION OF THE DRAWINGS

FIG. 1 is a block diagram depicting one embodiment of an improved X-ray microscope according to one aspect of the invention.

FIG. 1A is a block diagram depicting a sample stage that is aligned with a higher order diffraction point according to one aspect of the invention.

FIG. 3 is a block diagram depicting some fundamental microscopy concepts that are relevant to the disclosed invention.

FIG. 4 is a drawing depicting the diffractive effects of a zone plate array and the relevant orders of diffraction generated by the zone plate array.

DETAILED DESCRIPTION OF THE PREFERRED EMBODIMENTS

Figure 2A:
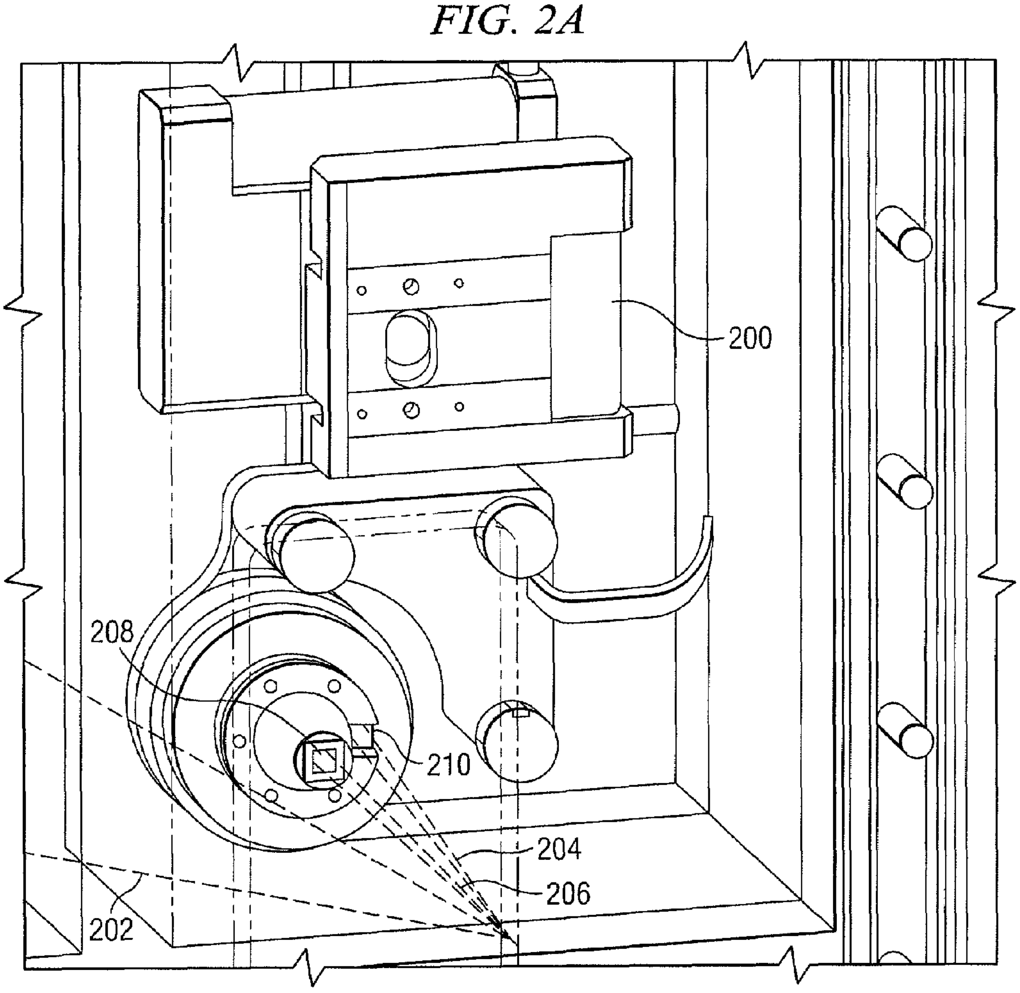
FIG. 2A is a drawing depicting one embodiment of a condenser zone plate apparatus according to one aspect of the invention.

One embodiment of an improved X-ray microscope system 100 is depicted in FIG. 1. In FIG. 1, a high-power laser system 105 provides short pulses of laser radiation that illuminates a target 110. The laser system of 105 should be of sufficient power to deliver enough power per unit area when focused to a very small spot size, for example having a diameter of 50 μm or less, to form a small plasma capable of emitting short wavelength radiation. Since the spot size of the illumination is so small, it is effectively a point source for the emitted radiation. Desirable wavelengths of emitted radiation can be those associated with X-rays, including soft X-rays, for example having a wavelength in the range of 0.5-160 nm. Examples of laser systems suitable for use with the disclosed embodiment include the BriteLight.™. laser available from JMAR Technologies, Inc. of San Diego, Calif., and laser systems described in U.S. Pat. Nos. 5,434,875; 5,491,707; and 5,790,574, all of which are hereby incorporated by reference into this description. Further examples of X-ray point sources suitable for use in this system are described in U.S. Pat. Nos. 5,089,711 and 5,539,764, which are both hereby incorporated by reference into this description. Various other laser systems 105 and targets 110 suitable for use in this system are also described in the commonly owned U.S. patent application Ser. No. 10/907,321 entitled "Morphology and Spectroscopy of Nanoscale Regions Using X-rays Generated by Laser Produced Plasma," which is hereby incorporated by reference into the specification of this application.

A condenser 115 captures some of the X-rays (or short-wavelength radiation) emitted by the point source 110 and focuses those X-rays onto sample stage 120. According to one embodiment, the condenser 115 comprises a zone plate lens having a focal length F.sub.1. After the X-rays pass through the sample 120, they are captured by an objective lens 125, which preferably comprises another zone plate lens. Since the objective zone plate lens 125 is merely trying to collimate the X-rays scattered by the sample 120, the objective zone plate lens 125 will generally be placed so that its focal length F.sub.1 is aligned with the sample plate 120. After passing through the objective zone plate lens 125, the X-rays are passed to an imaging device 130, such as a CCD array. A pinhole device 117 may also be introduced into the system between the condenser 115 and the sample 120 so as to filter out any unwanted wavelengths in the illumination of the sample. Suitable pinhole sizes can include 10 mu.m, 25 mu.m, 50 mu.m, 75 .mu.m, and 100 mu.m.

Since the condenser zone plate 115 is required to focus X-rays emanated from a point source 110, the condenser is placed at a distance from the point source target 110 that is twice the focal length 2F.sub.1of the condenser zone plate lens 115. Similarly, the sample 120 must be placed at a distance that is twice the focal length 2F.sub.1of the condenser zone plate lens 115 in order to properly focus the X-ray illumination on the sample 120. However, by placing the sample at a distance that is twice the focal length 2F.sub.1of the condenser zone plate lens 115, the numerical aperture of the condenser 115 is greatly reduced. To offset the negative effects of a smaller numerical aperture, the sample 120 can be moved closer to the condenser zone plate 115 so that it is aligned with the a higher diffraction order of the condenser zone plate 115 (e.g., the third, fifth, seventh order, etc.). This concept is depicted in FIG. 1A where a sample stage 120 is aligned with the third diffractive order (n=3) of the condenser zone plate 115. The third diffraction order of the condenser zone plate 115 is a maxima, but its intensity is significantly less than the intensity of the first order, according to the ratio 1/n.sup.2. Although moving a sample to a higher diffraction order will result in less intense illumination, the resolution of the image can be greatly improved since the numerical aperture of the objective zone plate lens is increased.

Figure 2B:
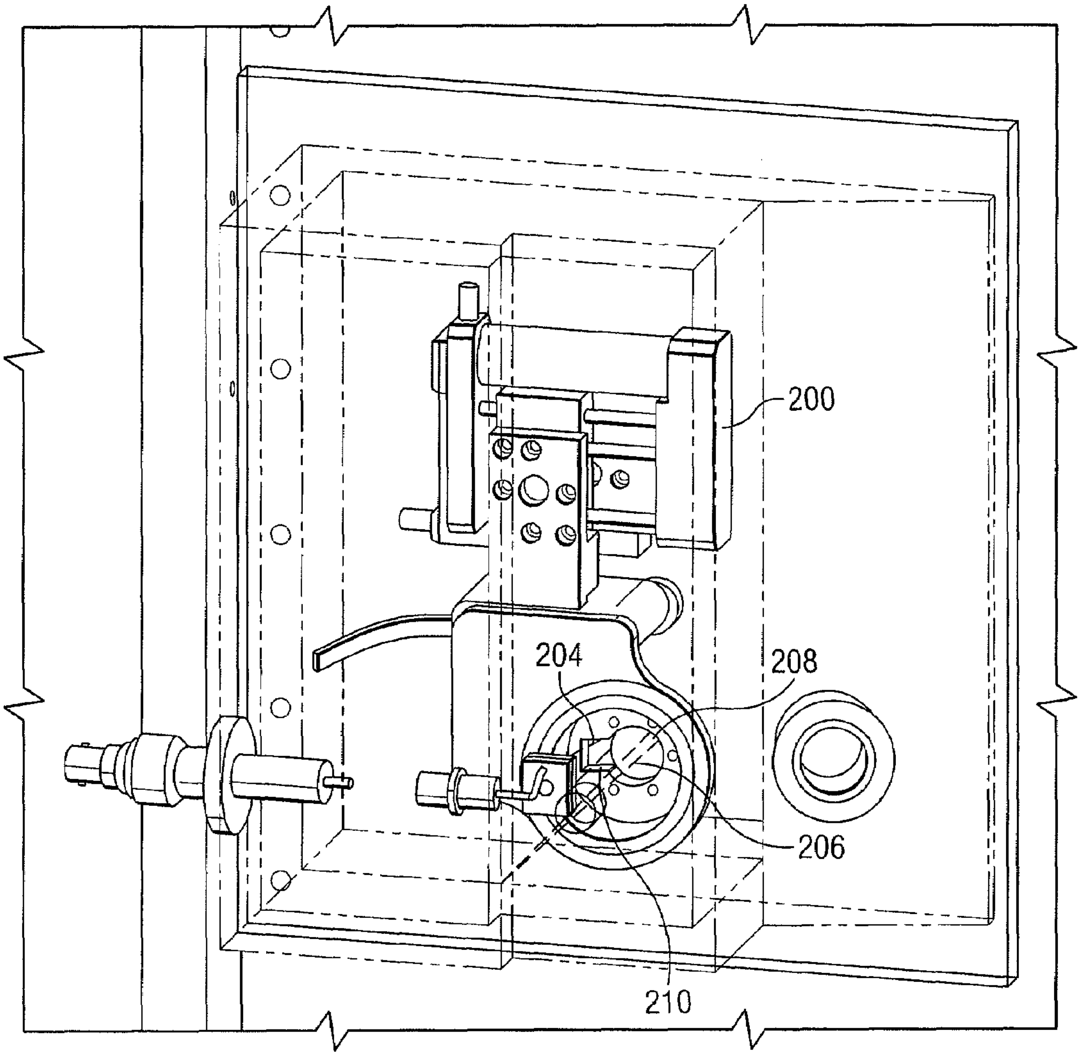
FIG. 2B is a drawing depicting another view of the condenser zone plate apparatus depicted in FIG. 2A.
Figure 2C:
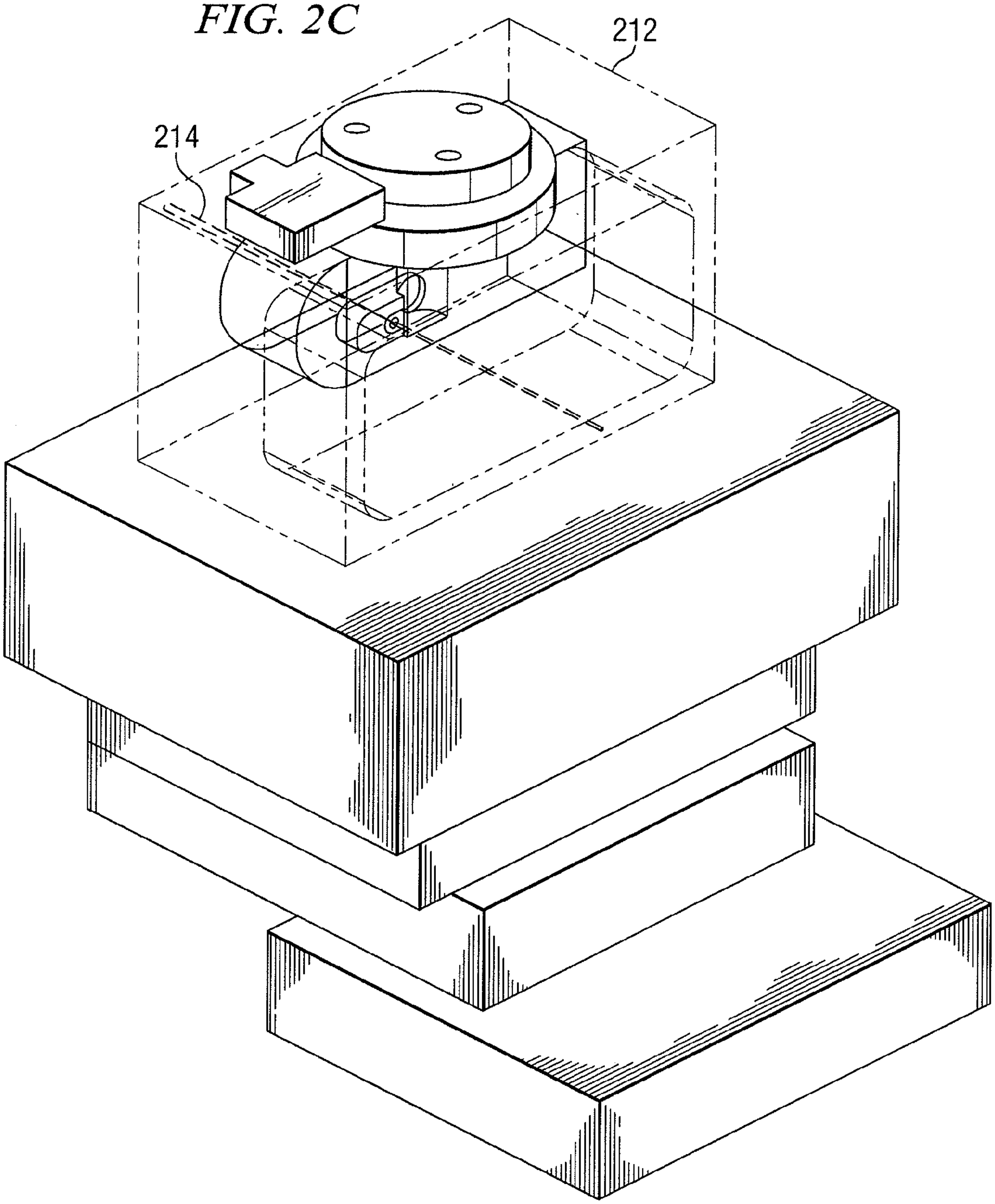
FIG. 2C is a drawing depicting one embodiment of a sample stage apparatus according to one aspect of the invention.
Figure 2D:
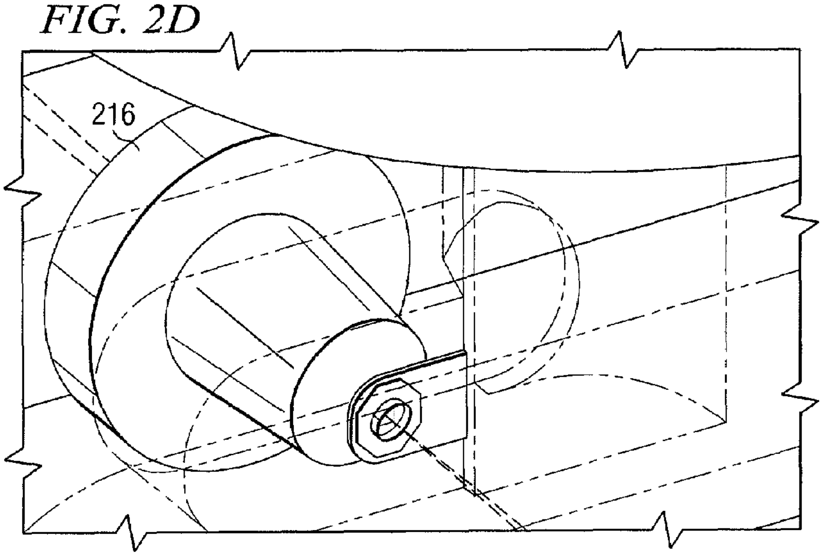
FIG. 2D is a drawing depicting one embodiment of a pinhole mechanism according to one aspect of the invention.
Figure 2E:
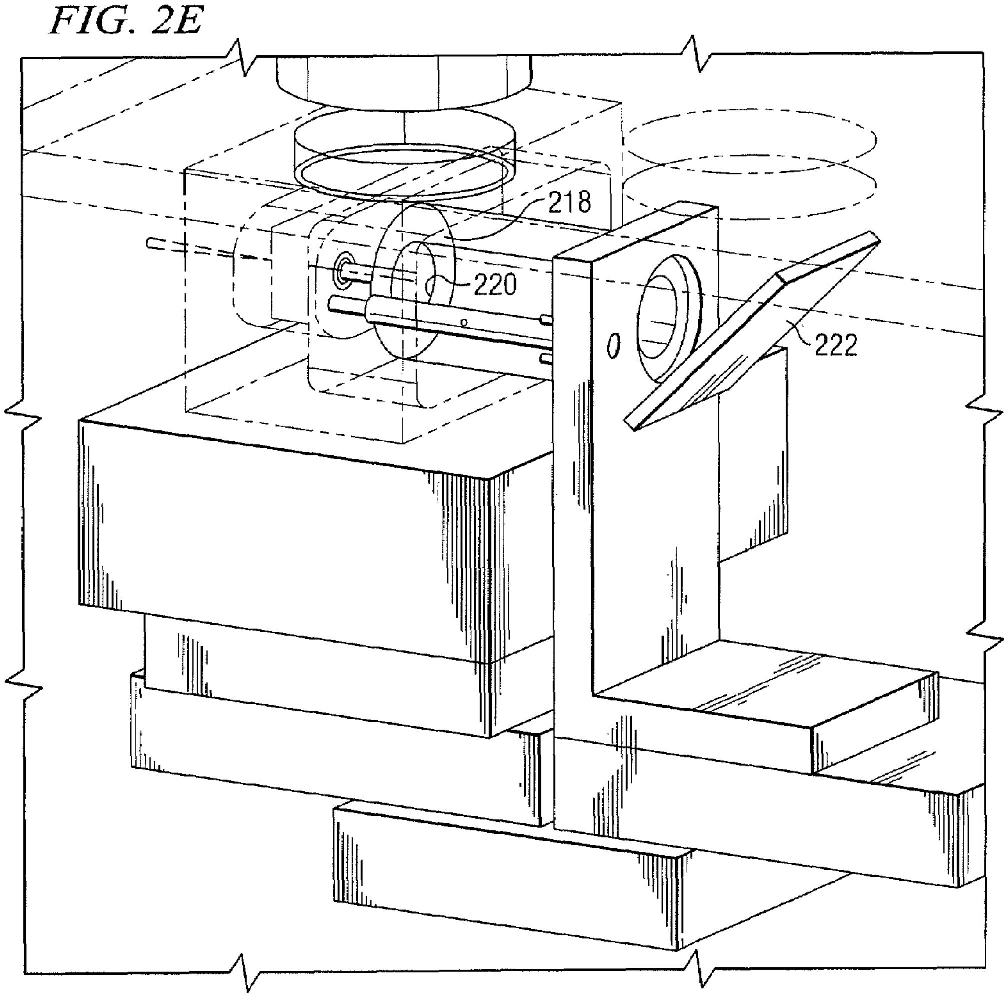
FIG. 2E is a drawing depicting one embodiment of objective zone plate apparatus according to one aspect of the invention.
Figure 5:
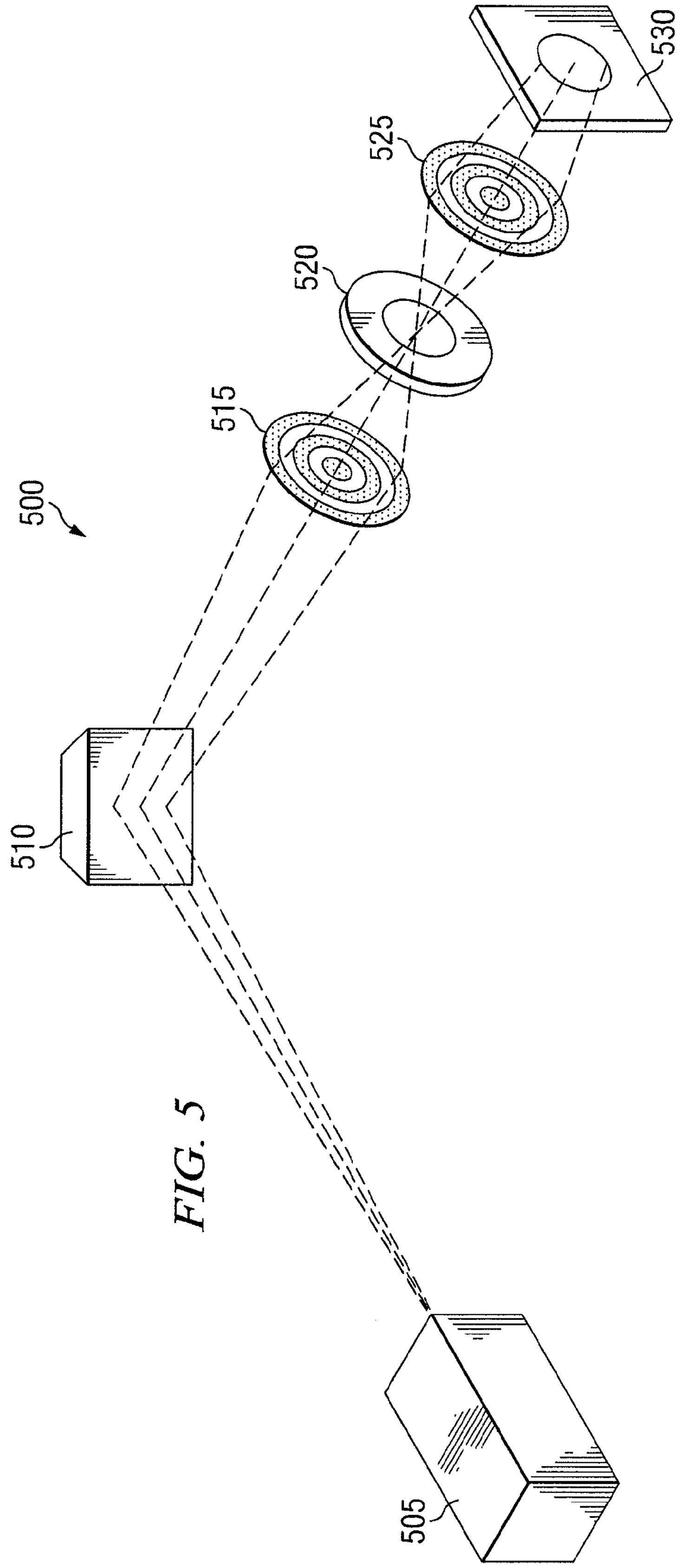
FIG. 5 is a block diagram depicting an X-ray microscope using a nearly collimated X-ray illumination source.

Alternative embodiments for the zone plate portions of the invention are disclosed in FIGS. 2A 2E. In FIG. 2A, a condenser apparatus 200 is depicted. In FIG. 2A, the laser radiation 202 impacts a point source target causing the emissions of X-rays 204, 206 from the point source. Although radiation will be emitted in all directions from the point source, only two narrow cones of emitted X-rays 204, 206 are depicted in FIG. 2A. One of these cones 204 is captured by a condenser zone plate array 208 and the other is capture by a dosimeter 210. The condenser zone plate array 208 and the dosimeter are mounted in a condenser apparatus 200. According to one embodiment of the invention, the condenser zone plate 208 will have a .DELTA.r of about 54 nm, a diameter of about 4444 mu.m, a central stop of 2000 mu.m, a focal length of about 71.2 mm (at 3.37 nm illumination), a numerical aperture of 0.031, and will comprise 20574 zones. The condenser apparatus 208 has five degrees of freedom: x—25 mm on an encoded PI stage (0.05 mu.m), y—5 mm on an encoded PI stage (0.05 mu.m), z—3 mm with a New Focus 3-axis stage, and tip/tilt with a New Focus 3-axis stage (0.7 mu.rad). An opposite side view of the condenser apparatus 200 is depicted in FIG. 2B. In FIG. 2B, X-rays 206 have been focused by the condenser zone plate array 208.

A representative example of a sample stage 212 is depicted in FIG. 2C. In FIG. 2C, the incoming X-rays 214 from the condenser 200 are depicted as entering from the left-hand side of the stage and exiting from the right-hand side. The stage provides high-resolution positioning and rotation of the sample to be imaged by utilizing four degrees of freedom: x 5 mm on an encoded Ibex stage (5 nm), y 5 mm on an encoded Ibex Z-wedge (5 nm), z 5 mm on an encoded Ibex stage (5 nm), and rotation of +/−70 deg. on a custom stage with nano-motion drive (0.1 deg.). A pinhole mechanism 216 can also be incorporated into the sample stage 212 as depicted in FIG. 2D. The pinhole mechanism is optional and can be moved in three degrees of freedom: x 5 mm encoded Ibex (5 nm), y 5 mm encoded Ibex (5 nm), z 5 mm encoded Ibex (5 nm). The pinhole apparatus 216 can be removed if desired.

A representative example of an objective zone plate apparatus 218 is depicted in FIG. 2E. In FIG. 2E, the X-ray radiation 214 enters from the left-hand side after passing through the sample. After this, the X-rays are collected by an objective zone plate lens 220, which focuses the X-rays on a mirror where the X-rays can be directed to appropriate imaging optics. According to one embodiment, the objective zone plate 200 will have a .DELTA.r of about 35 nm, a diameter of about 80 mu.m, no central stop, a focal length of about 0.830 mm (at 3.37 nm illumination), a numerical aperture of 0.048, and will comprise 572 zones. The objective zone plate apparatus 218 is designed to have three degrees of freedom: x 25 mm with an encoded Ibex stage (5 nm); y 5 mm with 3/16 200 set screw that aligns the optical to the X-rays (5 .mu.m); and z 5 mm with an encoded Ibex stage (5 nm).

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes that come within the meaning and ranges of equivalents thereof are intended to be embraced therein.

Additionally, the section headings herein are provided for consistency with the suggestions under 37 C.F.R.sctn. 1.77 or otherwise to provide organizational cues. These headings shall not limit or characterize the invention(s) set out in any claims that may issue from this disclosure. Specifically and by way of example, although the headings refer to a “Technical Field,” the claims should not be limited by the language chosen under this heading to describe the so-called technical field. Further, a description of a technology in the “Background” is not to be construed as an admission that technology is prior art to any invention(s) in this disclosure. Neither is the “Summary” to be considered as a characterization of the invention(s) set forth in the claims found herein. Furthermore, any reference in this disclosure to “invention” in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A short wavelength compound microscope device comprising:

a condenser zone plate operable to receive short wavelength radiation from a point source and focus the short wavelength radiation onto a specimen sample;

wherein the sample aligned with an order of diffraction of the condenser zone plate that is greater than one;

and an objective zone plate operable to receive short wavelength radiation that has passed through the specimen sample and focus the short wavelength radiation onto an imaging device.

2. A microscope device according to claim 1, wherein the numerical aperture of the condenser zone plate is greater than or equal to the numerical aperture of the objective zone plate.

3. A microscope device according to claim 1, wherein the sample is aligned with the third order of diffraction of the condenser zone plate that is proximal to the condenser zone plate.

4. A microscope device according to claim 1, wherein the sample is aligned with the fifth order of diffraction of the condenser zone plate that is proximal to the condenser zone plate.

5. A microscope device according to claim 1, further comprising a pinhole device disposed between the condenser zone plate and the sample, wherein the pinhole device permits radiation of a desired wavelength to pass through the pinhole to the sample and blocks radiation of undesired wavelengths from the sample.

6. A microscope device according to claim 5, wherein the pinhole apparatus has an aperture selected from the group consisting of: 10 μ; 25 μm; 50 μm; 75 μm; and 100 μm.

7. A microscope device according to claim 1 wherein the condenser zone plate has Δr of about 54 nm, a diameter of about 4444 μm, a central stop of 2000 μm, a focal length of about 71.2 mm (at 3.37 nm illumination), a numerical aperture of about 0.031, and comprises 20574 zones; and wherein the objective zone plate has Δr of about 35 nm, a diameter of about 80 μm, no central stop, a focal length of about 0.830 mm (at 3.37 nm illumination), a numerical aperture of about 0.048, and comprises 572 zones.

8. A microscope device according to claim 1, further comprising an imaging device.

9. A microscope device according to claim 8, wherein the imaging device comprises a CCD array.

10. A microscope device according to claim 1, wherein the short wavelength radiation point source comprises a metallic target illuminated by at least one high-powered laser with a spot size less than about 50 μm.

11. An X-ray microscope device operable for imaging a sample with X-rays in the range of about 0.1 to about 10 nm, the microscope device comprising:

a condenser zone plate operable to receive X-ray radiation from a point source and focus the X-ray radiation onto a specimen sample;

a sample stage onto which the specimen sample is mounted, where the sample is aligned with a third order of diffraction of the condenser zone plate that is proximal to the condenser zone plate;

a pinhole device disposed between the condenser zone plate and the sample stage, wherein the pinhole device permits X-rays of a desired wavelength to pass through the pinhole to the sample stage and blocks radiation of undesired wavelengths from the sample stage;

an objective zone plate operable to receive X-ray radiation that has passed through the specimen sample and focus the short wavelength radiation onto an imaging device;

and wherein the numerical aperture of the condenser zone plate at the third order of diffraction is greater than or equal to the numerical aperture of the objective zone plate.

12. An X-ray microscope device according to claim 11, wherein the pinhole apparatus has an aperture selected from the group consisting of: 10 μm; 25 μm; 50 μm; 75 μm; and 100 μm.

13. An X-ray microscope device according to claim 11: wherein the condenser zone plate has Δr of about 54 nm, a diameter of about 4444 μm, a central stop of 2000 μm, a focal length of about 71.2 mm (at 3.37 nm illumination), a numerical aperture of about 0.031, and comprises 20574 zones; and wherein the objective zone plate has Δr of about 35 mm, a diameter of about 80 μm, no central stop, a focal length of about 0.830 mm (at 3.37 nm illumination), a numerical aperture of about 0.048, and comprises 572 zones.

14. An X-ray microscope device according to claim 11, further comprising an imaging device.

15. An X-ray microscope device according to claim 11, wherein the imaging device comprises a CCD array.

16. An X-ray microscope device according to claim 11, wherein the short wavelength radiation point source comprises a metallic target illuminated by at least one high-powered laser with a spot size less than about 50 nm.

17. A method of imaging microscopic features of a specimen sample in a compound microscope comprising:

providing a point source of short wavelength radiation;

focusing the short wavelength radiation onto the specimen sample with a condenser zone plate array;

aligning the sample with an order of diffraction of the condenser zone plate that is greater than one and proximal to the condenser zone plate;

focusing the short wavelength radiation that has passed through the specimen sample with an objective zone plate lens so that the short wavelength radiation is directed onto an imaging device.

18. A method according to claim 17, wherein providing a point source of short wavelength radiation further comprises illuminating a metallic target with at least one high-power laser having a spot size less than about 50 μm.

* * * * *